United States Patent [19]

Jackson

[11] 4,313,705
[45] Feb. 2, 1982

[54] UNLOADER FOR STORAGE BINS

[76] Inventor: William J. Jackson, P.O. Box 266, Mendota, Ill. 61342

[21] Appl. No.: 6,765

[22] Filed: Jan. 26, 1979

[51] Int. Cl.$^3$ ............................................. B65G 65/46
[52] U.S. Cl. .................................... 414/312; 198/667; 198/669
[58] Field of Search ............... 414/310, 306, 311, 312; 198/616, 558, 513, 669, 667; 222/404, 413; 406/53, 56

[56] References Cited

U.S. PATENT DOCUMENTS

| 1,274,548 | 8/1918 | Holnagel et al. | 198/616 X |
| 2,418,575 | 4/1947 | Christiansen | 198/513 X |
| 3,487,961 | 1/1970 | Neuenschwander | 414/310 X |
| 3,647,094 | 3/1972 | Jackson | 414/312 |

Primary Examiner—Leslie J. Paperner
Assistant Examiner—Edmond G. Rishell, Jr.
Attorney, Agent, or Firm—Wells, St. John & Roberts

[57] ABSTRACT

A device for unloading particulate material from circular storage bins having central discharge sumps. The device includes two augers extending radially in diametric opposition from a vertical pivot axis adjacent the discharge sump. The augers are powered to pivot forwardly about the vertical axis and are also rotated about longitudinal auger axes to engage and move particulate material toward the vertical axis and into the central outlet sump. A central counter rotating auger drive means is powered to rotate the augers in opposite directions. The counter rotating drive means includes a single input drive shaft. The single input shaft rotates two worm gears of a transmission means. Two worm wheels, each attached to a respective auger, mesh with the worm gears. The worm gears and worm wheels function as gear reduction units to transmit rotation of the input shaft to opposite geared down directional rotation of the augers. The single input drive shaft is also operatively connected to a hydraulic motor. Fluid under pressure from the hydraulic motor is delivered to outbound drive wheel assemblies which, in turn, pivot the auger units forwardly about the vertical axis. Splash guards are mounted to the auger assemblies, facing forwardly to engage and direct material downwardly toward the augers.

9 Claims, 8 Drawing Figures

UNLOADER FOR STORAGE BINS

BACKGROUND OF THE INVENTION

The present invention is related to particulate material unloading devices of the type having a rotating auger powered to move about a central discharge sump in the floor of a storage bin and to engage and move particulate material toward the discharge sump.

Problems have been encountered in unloading large particulate storage bins. Such bins usually have a substantially horizontal floor and central discharge sumps. The discharge sumps are centrally located in the circular storage bins since any form of side unloading could cause serious structural problems with the walls of the bin.

The unloading problem has been solved to some degree by unloading auger mechanisms mounted within the bins. They are usually powered to move along the bin floor about a central vertical axis. The augers are powered to rotate as they move to engage particulate material and move it toward the sump discharge. One such device is illustrated by U.S. Pat. No. 3,647,094 granted to applicant, William J. Jackson on Mar. 7, 1972.

The device disclosed in U.S. Pat. No. 3,647,094 includes a single radially separable auger assembly extending from the center outlet sump and the vertical axis defined thereby. A tubular housing surrounds the auger with selectively operable doorways on a front side for guiding particulate material along the auger that rotates inside.

Such unit operates satisfactorily in unloading particulates such as grain from circular bins of up to forty feet high and one hundred feet in diameter. However, increasing unloader discharge demands and larger storage bins make a double auger assembly desirable.

Unloaders having diametrically opposed auger assemblies are not new. U.S. Pat. No. 1,274,548 granted Aug. 6, 1918 to W. A. Holnagel et al illustrates such an arrangement. Opposed auger unloaders have, in the past, been serviceable in individual specialized applications. However, modern equipment design has facilitated construction of hugh storage bins. Modern bins may receive various forms of loose particulate material in piles over eighty feet high, thus creating extremely high pressures at the bin floor.

Considerable power is required to rotate two augers about their axes and to drive them about the vertical axis of the outlet sump. Standard bevel gear drives used for powering prior opposed augers are too bulky, along with the required gear reduction mechanisms, to fit within the outlet sumps. Yet the bevel gear arrangement shown as early as U.S. Pat. No. 1,274,548 provides the desirable feature of driving the diametrically opposed augers in opposite directions about their respective axes. Counter auger rotation is more desirable than having two opposed augers that are rotated in the same direction with one auger having a right hand thread and the other auger having a left hand thread. Right and left hand augers, if turned about their axes in the same direction, will work unequally on opposite sides of the vertical rotational axis. One auger will have the tendency to "climb" the particulate pile while the other will rotate to effectively dig into the pile and move the material toward the outlet sump. Unequal discharge efficiency causes excessive strain at the center pivot point and results in low product output.

It becomes desirable then to provide an opposed auger unloader that has a unitary drive mechanism capable of delivering sufficient torque to oppositely rotate diametrically opposed augers while remaining sufficiently compact to fit easily within a standard outlet sump. It is also desirable to provide an unloader that has increased discharge capacity, even under heavily loaded conditions.

BRIEF DESCRIPTION OF THE DRAWINGS

A preferred embodiment of the present invention is illustrated in the accompanying drawings in which.

DETAILED DESCRIPTION OF A PREFERRED EMBODIMENT

Figure 1:
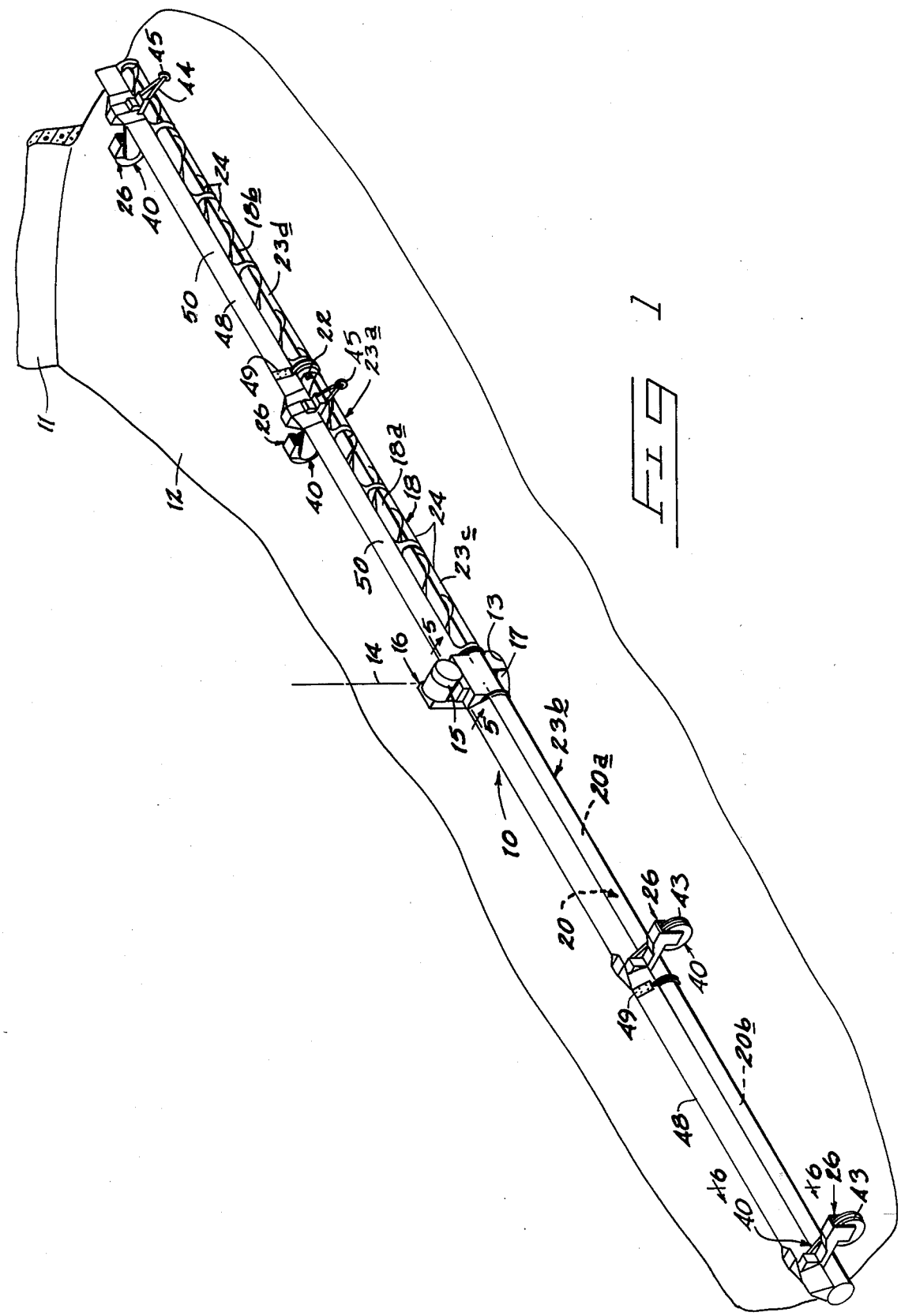
FIG. 1 is a diagrammatic isometric view of the present unloader device in a bin structure with a portion of the floor of the bin showing.
Figure 2:
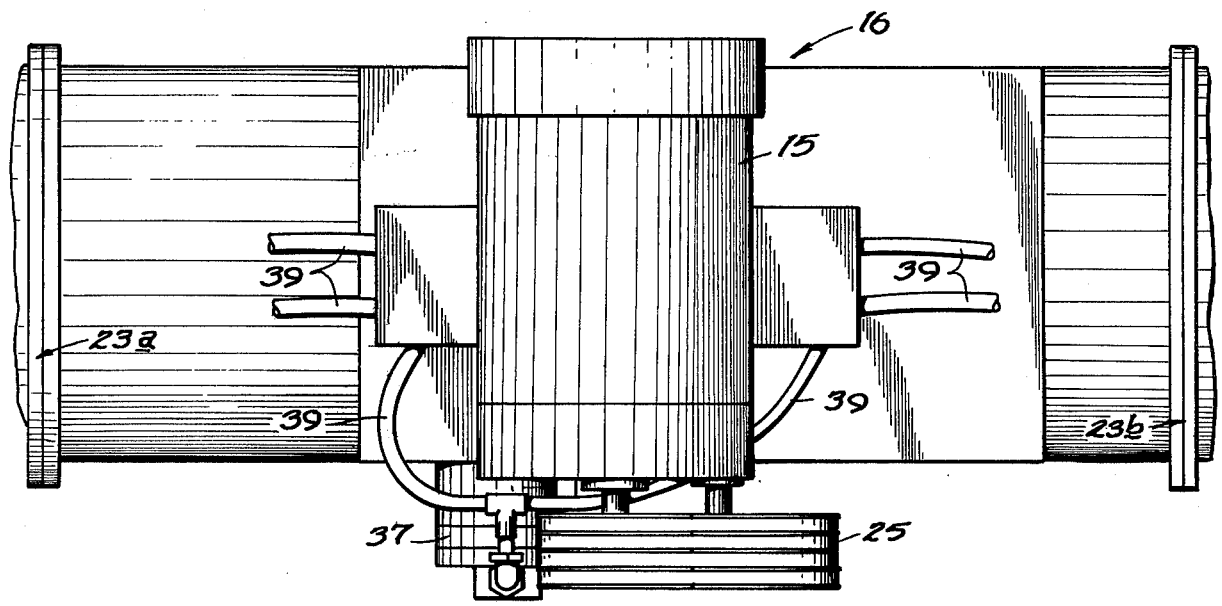
FIG. 2 is an enlarged plan view of a central counter rotating auger drive means of the present invention.
Figure 3:
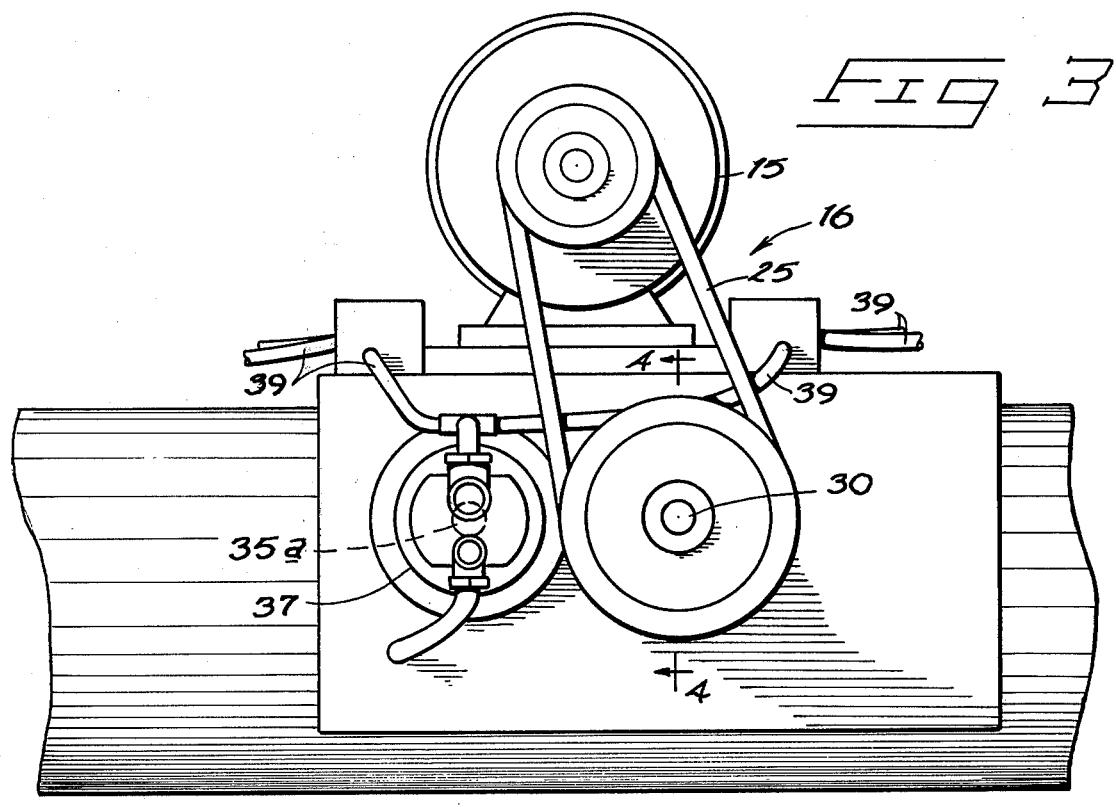
FIG. 3 is an elevation view of the elements shown in FIG. 2.
Figure 4:
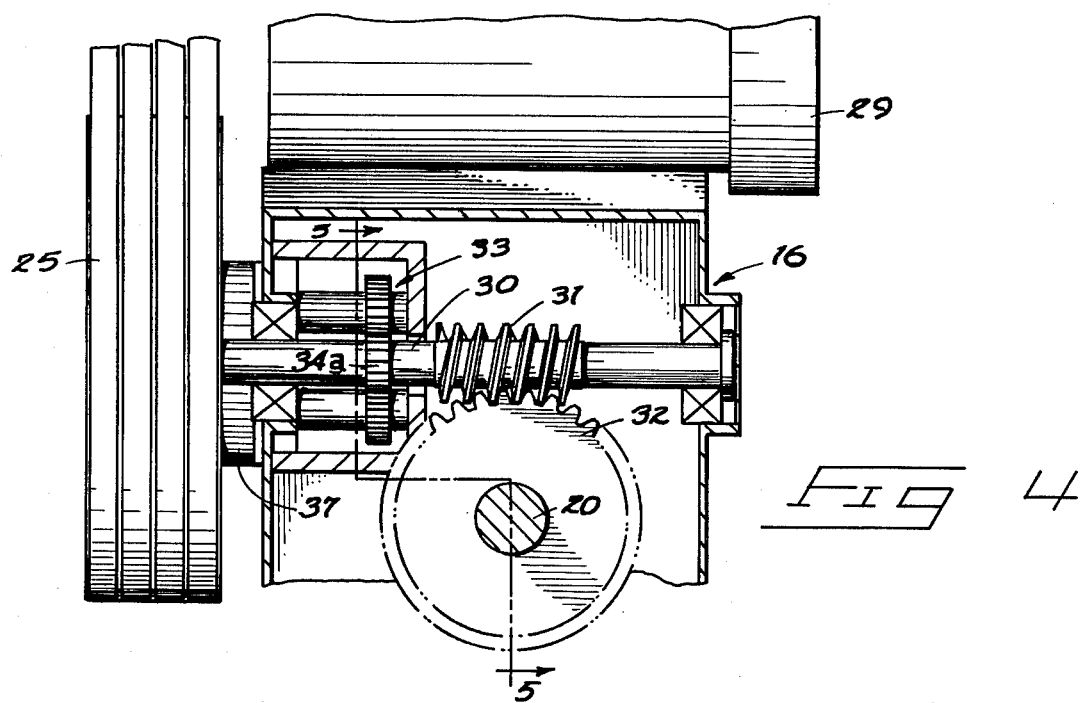
FIG. 4 is an enlarged fragmentary sectional view taken along line 4—4 in FIG. 3.
Figure 5:
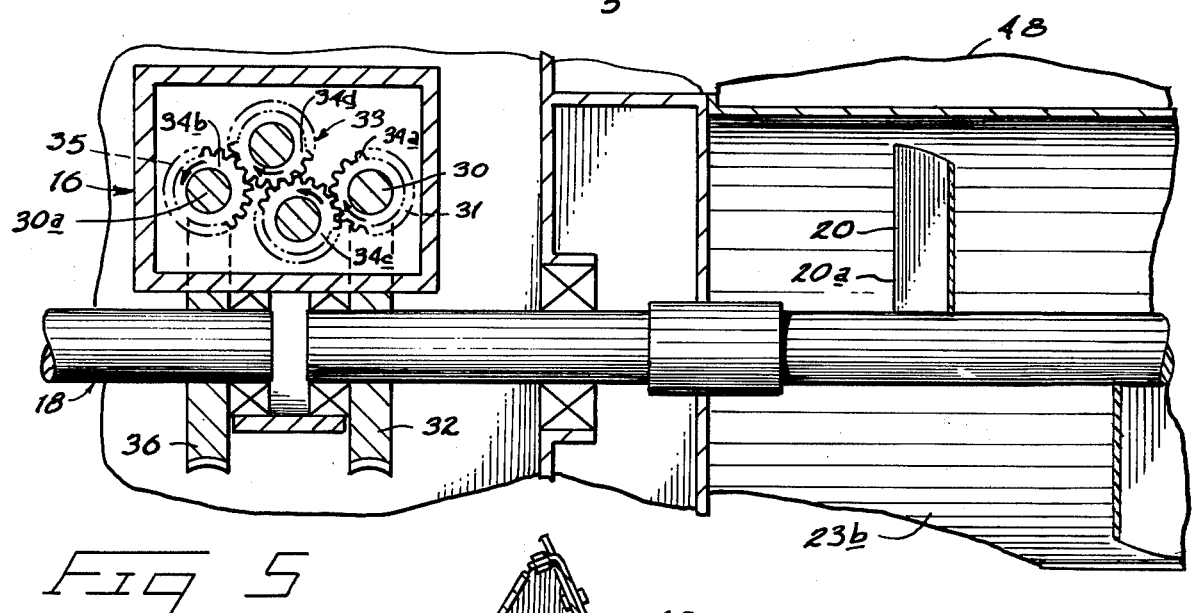
FIG. 5 is an elevational sectional view through the central counter rotating auger drive means of the present invention taken substantially along line 5—5 in FIG. 4.

The present unloading device is illustrated by way of example in FIG. 1 and is generally designated therein by the reference character 10. The unloading device 10 is intended for use in large circular particulate storage bins 11 having substantially horizontal floors 12 and central outlet sumps 13. The drawing shows only a portion of a bin 11, it being understood that such bins are well known in the particulate material storage art. The sump 13 is formed through the floor 12 and is generally centered on a vertical axis 14. Axis 14 is generally the central vertical axis for the bin 11. The size of the outlet opening for the sump is dictated by the size of the bin and the type of particulate material stored therein.

For purposes of this disclosure, "particulate material" is defined as any form of flowable solid particles such as grain, corn, beans that may be stored in the large upright storage bins 11.

The present device includes a central counter rotating auger drive means 16 mounted at a pivot structure 17 within the outlet sump 13. Drive means 16 is operated by a central power means such as a motor 15. The drive means 16 powers first and second radially extending augers 18 and 20 respectively to simultaneously rotate the augers about their individual radial auger axes. The first auger 18 is rotated in a first angular direction about its axis while the second auger 20 rotates in an opposite angular direction. A pivot drive means 26 is also provided that is operatively connected to the motor 15 for pivoting the augers 18, 20 about the vertical axis 14.

First auger 18 is comprised of an inner section 18a and a coaxial radially separable outer section 18b. A splicing bracket 22 is provided to releasably connect the two sections 18a and 18b so the outer auger section 18b may be selectively disengaged from section 18a during the unloading process. The inner auger is operatively connected to one side of the drive means 16. Auger 18 is powered through the motor 15 and drive means 16 to rotate in a first angular direction about its radial axis.

The second auger 20 is also comprised of two sections that are not specifically illustrated in the drawings but that are substantially identical to the auger section 18a and 18b of the first auger 18. The lengths of second sections also correspond with the lengths of first auger sections 18a and 18b. The second sections are releasably joined by a splicing bracket (also not shown) identical to bracket 22 provided to releasably connect sections 20a and 20b. The second sections may also be selectively disengaged during unloading. Bracket 22 and its counterpart on second auger 20 allow selective disengagement of the outer auger 18b and its counterpart on auger 20 to effectively reduce the diameter of "sweep" during initial unloading operations, if desired.

The second inner auger 20 is operatively connected to an opposite side of the drive means 16. Auger 20 is powered through motor 15 and drive means to rotate about its radial axis in an angular direction opposite to that of first auger 18.

Both augers include helical flights that extend outwardly from axis 14, both preferably having a "right hand" thread. Since flights of both augers are right handed but are rotated in opposite directions, each will effectively dig into the pile of material equally and deliver the engaged material inwardly toward the outlet sump.

Figure 6:
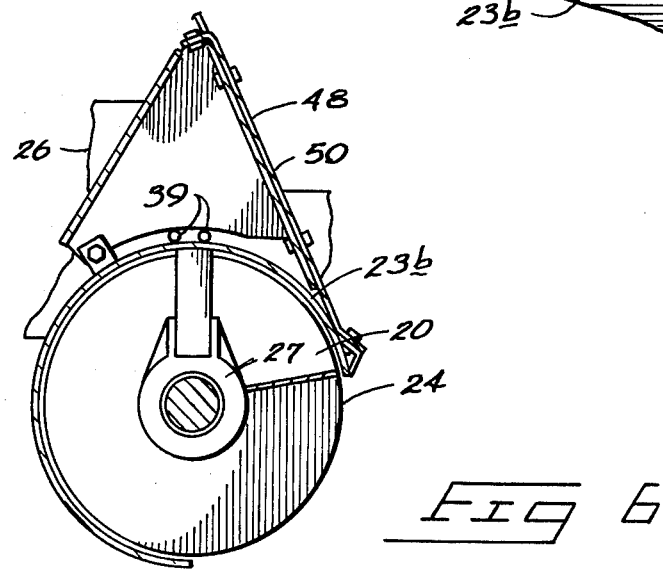
FIG. 6 is an enlarged fragmentary sectional view through the tubular casing taken along line 6—6 in FIG. 1, showing the splash guard of the present invention.

Augers 18 and 20 are partially encased within coaxial tubular casing units 23a and 23b respectively. Tubular casing units 23a and 23b are coaxial with the augers and are radially separable into sections. Inner tubular casing section 23c of casing unit 23a is attached to the drive means 16 at one end and extends coaxially outward with auger section 18a. The length of casing section 23c corresponds with the length of auger section 18a. An outer tubular casing section 23d is releasably and coaxially attached to inner casing section 23c, and extends therefrom a distance substantially equal to the length of outer auger section 18b. Hanger brackets and appropriate bearings 27 (FIG. 6) rotatably journal the augers within their respective casing sections. The casing unit 23b on the opposite side of drive means 16 is similarly provided in sections and with hanger brackets and bearings to coaxially journal the second auger 20.

Both casing units 23a and 23b include forwardly facing openings 24 that allow access for the particulate material to the augers. The casing units then guide the material engaged by the augers radially inward to the sump. Removable doors (not shown) may be provided to cover a selected number of the openings 24.

The door structures and separable nature of the augers, tubular casings and associated elements are not disclosed in detail by this specification. Reference is made to applicant's prior patent, U.S. Pat. No. 3,647,094 granted on Mar. 7, 1972. Portions of that patent relating to interconnection of the auger sections and tubular casing arrangements plus other details and elements facilitating physical separation of the augers 18 or 20 are hereby incorporated by reference into the present application.

The counter rotating drive means 16 and power means are illustrated in substantial detail by FIGS. 2-5. The power means, as discussed above, may be provided in the form of a motor 15. Motor 15 may receive electrical energy through a commutator or collector ring (not shown) mounted within the pivot 17.

Motor 15 is drivingly connected to the drive means 16 through appropriate pulley and drive belt connections 25. The pulley and drive belt connections 25 are made between motor 15 and a single input drive shaft 30 of drive means 16. The drive shaft 30 is operably connected through a transmission means 33 to the augers 18 and 20. Transmission means 33 is provided within drive means 16 to rotate the augers in opposite directions.

Drive shaft 30 has a worm gear 31 of transmission means 33, and a driving spur gear 34a. The worm gear 31 drives a worm wheel 32 that is affixed to the second auger 20. The shaft 30 is tangential with the worm wheel 32.

The driving spur gear 34a is one of a series of spur gears that, along with worm gear 31 and a second worm gear 35, are included with the transmission means 33. The second worm gear 35 drives a second worm wheel 36. The second worm wheel 36 is affixed to an inner end of the first auger 18 to drive it about its radial axis.

The second worm gear 35 is affixed to a shaft 30a. Shaft 30a is driven through the common transmission means 33 by a spur gear 34b that is also affixed to shaft 30a. The axis of shaft 30a is tangential with worm wheel 36.

Intermediate idler spur gears 34c and 34d connect spur gears 34a and 34b so that rotation in one direction of spur gear 34a will cause opposite rotation of spur gear 34b. The direction of rotation of the spur gears 34a-34d are shown by arrows in FIG. 5. In the preferred embodiment the worm gears 31 and 35 have the same directional threads. Alternatively the transmission means 33 may include a three spur gear arrangement (not shown) with two of the spur gears on the shafts 30 and 30a with the remaining spur gear in meshing engagement with both. The three spur gear arrangement would effect motion of the worm gears 31 and 35 in the same angular rotational direction. The worm gears would thus be selected to have opposed directional threads, that is one would be right threaded and the other left threaded. The oppositely threaded worm gears would then impart opposite rotation to the engaged worm wheels. Either construction of the transmission means 33 will produce opposite rotation of the augers.

The worm gears and wheels provide substantial gear reduction in a compact space. For example, the input rpm through motor 15 may be a standard 1750 rpm whereas the output rpm of the augers 18 and 20 may be 170 rpm, mainly through appropriate reduction ratios between the worm gears 31 and 35 and the worm wheels 32 and 36. The compact configuration of the drive means 16 is also facilitated through the specific arrangement of the transmission means 33, particularly the coaxial relationship of the drive shaft 30 and its attached spur gear 34a and worm gear 31, and the parallel shaft 30a with its coaxial attached spur gear 34b and worm gear 35. The parallel shafts 30 and 30a are specifically oriented within the housing for the transmission means to be tangential with the worm wheels 32 and 36.

Figure 7:
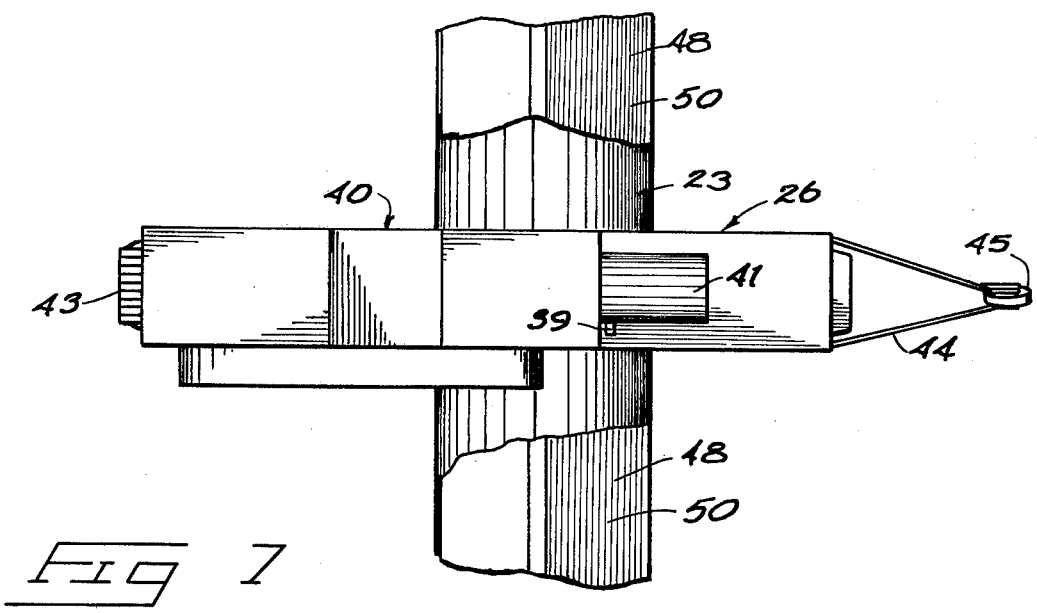
FIG. 7 is a fragmentary plan view of means for moving the auger means about a central vertical axis.
Figure 8:
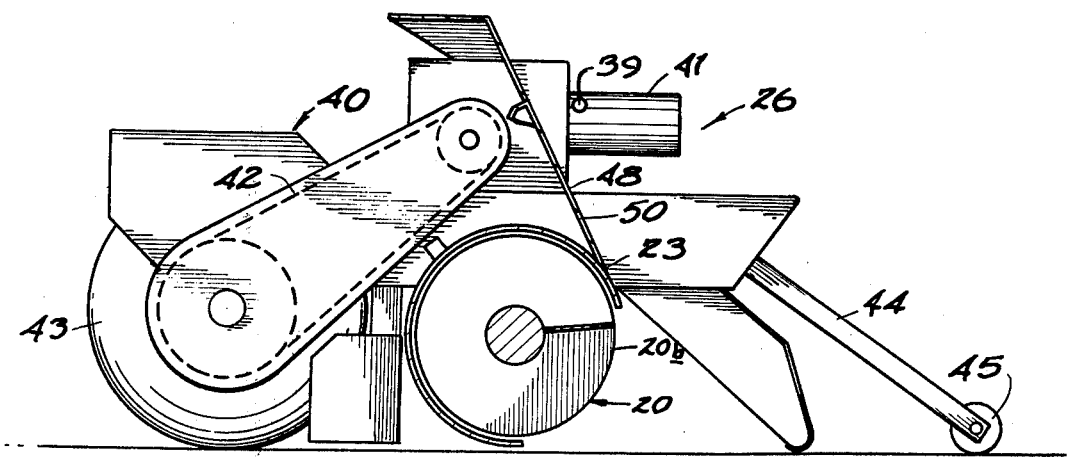
FIG. 8 is an elevational view of the means shown in FIG. 7.

A pivot drive means 26 for pivoting the augers 18 and 20 in forward direction about the vertical axis 14 is best illustrated in FIGS. 7 and 8. Pivot drive means 26 basically includes a powered drive wheel assembly 40 for each of the separable auger sections. The powered drive wheel assemblies 40 operate in response to operation of the central counter rotating auger drive means 16.

A hydraulic pump 37 is operatively, coaxially connected to the shaft 30a. Pump 37 is connected through means of appropriate hydraulic hoses 39 to motors 41 on the assemblies 40. Pressurized fluid is received through the hoses 39 from pump 37 to operate the hydraulic motors 41 on each of the drive wheel assemblies. Motors 41 are connected by appropriate linkages 42 to rearward drive wheels 43. The drive wheels 43 are powered to rotate about axes that are parallel to the rotational axes for the augers 18 and 20 and are substantially radial with respect to the vertical axis 14.

Fork arms 44 protrude forwardly from each of the drive wheel assemblies 40. The fork arms converge forwardly to mount forward material diverting wheels 45 thereon. The fork arms 44 and wheels 45 function to divide or separate material ahead of the powered drive wheel assemblies.

An additional feature of the unloading device includes upstanding splash guards 48 on the tubular casing units 23a and 23b to direct particulate material downwardly toward the augers 18 and 20. The splash guards 48 include separable flanges 49 (FIG. 1) that allow radial disengagement of the tubular casing sections when it is desired to do so as described in the above reference patent. Splash guards 48 include forwardly facing areal surfaces 50 that are inclined downward and forward. The forwardly facing surfaces 50 engage the particulate material as the augers 18 and 20 are moved forwardly about the axis 14. Surfaces 50 confront a greater amount of particulate material so forward motion of the auger means 18 and 20 about the axis 14 is more inhibited than it would be without the splash guards 48. Surfaces 50 cause downward flow of the particulate material to the augers and enables a higher discharge rate through the outlet sump, particularly when the material level within the bin is at lower levels.

An unloading device incorporating details of the present invention as disclosed above has been installed in several grain storage bins and has operated at an output rate of 20,000 bushels per hour. This is a substantial increase over any presently known form of particulate unloading device for circular storage bins. The amount of torsion capable of being transmitted from the drive means 16 to the augers is substantial. This is especially true in comparison with known forms of bevel gear arrangements. The drive means 16 of the present device is physically compact and therefore presents only a small obstruction within the path of particulate material through the standard size outlet sump. The single input shaft and simplified connections between the worm gears, worm wheels and spur gears is such that little maintenance is required. The unitary drive through the hydraulic pump 37 substantially reduces the expense and physical complication for providing independent drive for each of the powered drive wheel assemblies 40.

The above description has been given by way of example, along with the accompanying drawings, to set forth a preferred form of the present invention. The following claims set forth the scope of my invention.

What I claim is:

1. A device for unloading particulate material from a pile in a circular storage bin to a central outlet sump in a floor of the bin beneath the pile, comprising:
   a first auger extending radially outwardly from a central vertical axis for rotation about a first auger axis;
   a second auger extending radially outward from the vertical axis in diametric opposition to the first auger for rotation about a second auger axis;
   a central counter rotating auger drive means operatively connecting the first and second augers adjacent the vertical axis for axially aligning the first and second augers to diametrically opposed relationship with the first and second auger axes being coaxial and for rotating the augers in opposite rotational directions;
   pivot drive means for pivoting the diametrically opposed first and second augers in a forward direction about the vertical axis;
   wherein the central counter rotating auger drive means includes;
   a worm wheel on each auger adjacent the vertical axis;
   a worm gear in meshing engagement with each worm wheel;
   a single drive shaft;
   means interconnecting the single drive shaft and worm gears for turning the worm wheels in opposite directions in response to turning motion of the drive shaft; and
   central power means for turning the single drive shaft.

2. The device as defined by claim 1 wherein each auger includes two separable radial sections and wherein the pivot drive means for moving the augers in a forward direction includes a powered drive wheel assembly for each radial section.

3. The device as defined by claim 2 wherein each auger section includes a tubular casing section rotatably receiving the auger sections and having forwardly facing openings for receiving particulate material and wherein the casing sections are radially separable.

4. The device as defined by claim 1 wherein the central counter rotating auger drive means includes a hydraulic pump means operatively connected to the drive shaft and wherein the pivot drive means for pivoting the first and second augers forwardly about the vertical axis includes hydraulic motors operably attached to the hydraulic pump.

5. The device as defined by claim 4 wherein the pivot drive means includes a fork arm projecting forwardly of each of the first and second auger means with each fork arm rotatably mounting a wheel.

6. The device as defined by claim 1 wherein one of the worm gears is affixed to the single drive shaft.

7. The device as defined by claim 1 wherein the means interconnecting the drive shaft and the worm gears includes a series of meshing spur gears with one of the spur gears affixed to the single drive shaft and wherein one of the worm gears is also affixed to the single drive shaft.

8. The device as defined by claim 7 further comprising a second shaft mounting the remaining worm gear and also mounting one of the series of spur gears.

9. The device as defined by claim 8 wherein the second shaft and the single drive shaft are parallel and positioned in tangential relation to the worm wheels.

* * * * *